M. A. MARQUETTE.
TIRE INFLATER.
APPLICATION FILED SEPT. 3, 1913.
1,253,856.
Patented Jan. 15, 1918.
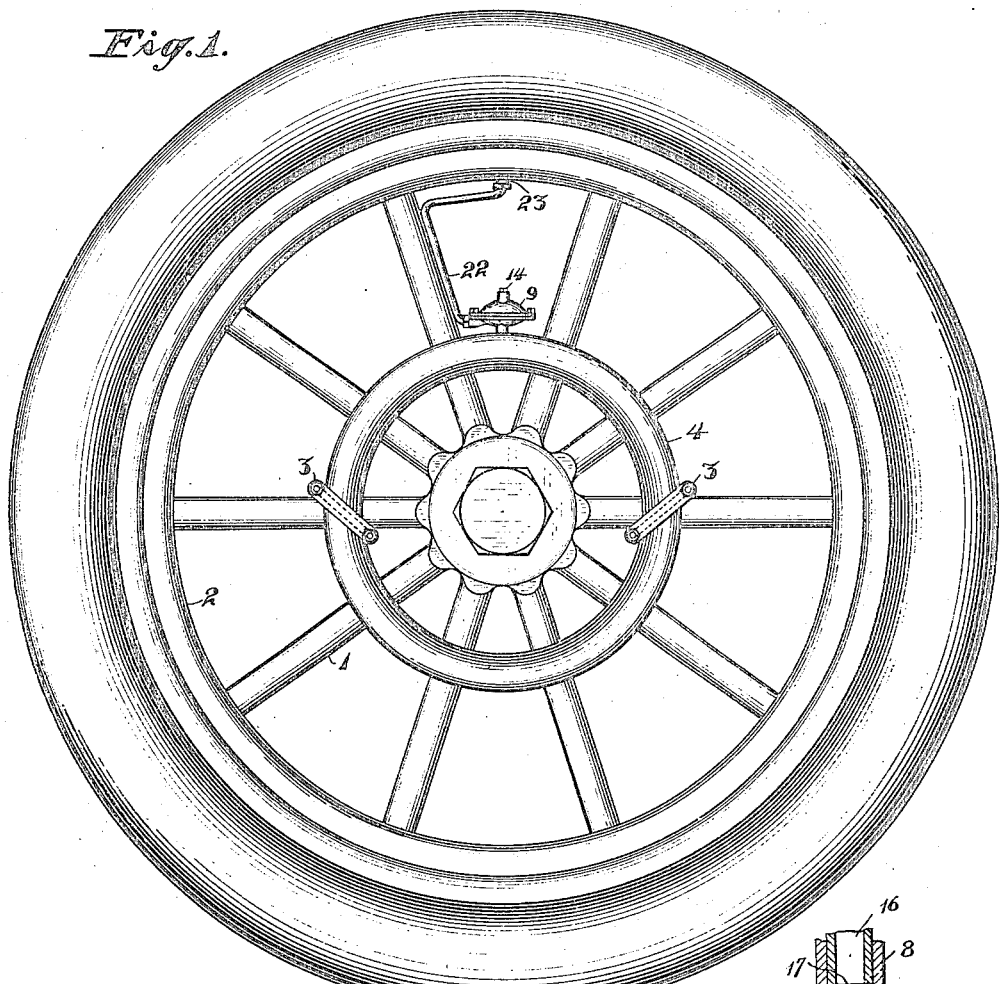
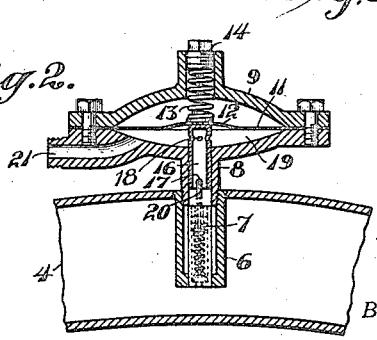
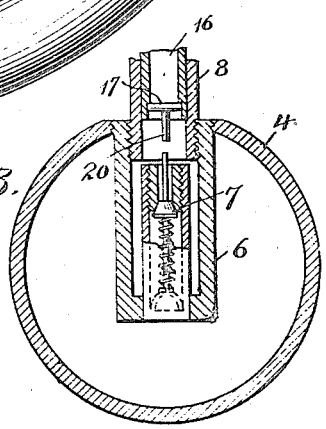
WITNESSES:
INVENTOR,
Melvon A. Marquette,
BY
ATTORNEY.

UNITED STATES PATENT OFFICE.

MELVON A. MARQUETTE, OF SAN FRANCISCO, CALIFORNIA.

TIRE-INFLATER.

1,253,856.        Specification of Letters Patent.     Patented Jan. 15, 1918.

Application filed September 3, 1913. Serial No. 787,980.

*To all whom it may concern:*

Be it known that I, MELVON A. MARQUETTE, a citizen of the United States, residing at San Francisco, in the county of San Francisco and State of California, have invented certain new and useful Improvements in Tire-Inflaters, of which the following is a description.

My invention relates to improvements in means for inflating tires.

The object of my invention is to provide detachable means for automatically maintaining the tire inflated at any desired degree of pressure.

In the accompanying drawings wherein like or similar reference characters represent like or corresponding parts:

Figure 1 is a side elevation of a wheel having a pneumatic tire and equipped with my improvement.

Fig. 2 is an enlarged central longitudinal section of the controlling mechanism of my device.

Fig. 3 is an enlarged fragmentary central longitudinal section of my device taken at substantially right angles to the section shown in Fig. 2.

In the form shown in the drawings an annular tank or bottle 4 is provided containing a highly compressed gas such for example as air or carbonic acid gas and secured to the spokes or other convenient portion of an automobile wheel 2 by suitable clamps 3 or other convenient means for rigidly maintaining the bottle in position on the wheel.

A tube 6 provided within the bottle 4 is rigidly secured in a radial position to the outer wall thereof. A valve 7 preferably of substantially the usual form and construction employed for preventing the escape of the pressure fluid from pneumatic vehicle tires is positioned within the tube 6 and arranged to prevent the escape of gas from the bottle.

A tubular guide 8 is secured to the outer end of the tube 6 and projects beyond the periphery of the bottle 4 and a casing 9 having a suitably shaped chamber formed therein is provided at the outer end of the guide 8.

A diaphragm 11 formed of any suitable material extends across the chamber formed in the casing 9 substantially perpendicular to the center line of the guide 8 and is rigidly secured at its margins to the walls of the casing. The diaphragm 11 is preferably curved or dished as at 12 and a spring 13 of any suitable form is provided with one end engaging the convex surface of the diaphragm 11 near its center and its opposite end extending into a tubular projection upon the casing 9.

A screw plug 14 is also provided in the tubular projection upon the casing 9 at the outer end of the projection and arranged to engage the outer end of the spring 13 to contact and adjust the pressure of the spring against the diaphragm 11.

A tube 16 is also positioned in the tubular guide 8 with one end connected to the concave side of the diaphragm 11 near its center. A cross piece 17 is provided at the opposite end of the tube 16 having a depending member 20 extending toward the valve 7. The several parts being so constructed and arranged that when the diaphragm 11 is moved toward the guide 8 by the spring 13 the member 20 will engage a part upon the valve 7 and open the valve.

Apertures 18 provided through the wall of the tube 16 adjacent the diaphragm are adapted to permit free communication between the interior of the tube and the part 19 of the chamber within the casing 9. A conduit 21 is provided extending from the part 19 of the chamber outward and a tube 22 connects the outer end of the conduit 21 to a suitable inlet connection 23 upon the tire.

The diaphragm 11 is preferably so constructed that its resilient resistance approximately counter-balances the minimum fluid pressure in any tire to which my device may be attached and the spring 13 is provided to supply additional pressure upon the valve 7 sufficient to balance the desired tire pressure under any given condition and for this purpose the plug 14 may be adjusted to secure the desired working pressure required.

The device operates in the following manner. Suppose for example, that it is desired to maintain the pressure within the tire at sixty pounds to the square inch. The screw plug 14 is adjusted until the combined force exerted by the diaphragm and spring 13 will just balance a pressure of sixty pounds to the square inch in the space 19. If now the pneumatic tire to which the device is connected leaks or for any other reason the pressure in the tire and chamber 19 falls below sixty pounds to the square inch it is obvious that the diaphragm will move toward the space 19 thus forcing the tube 16 toward the casing 6 and engaging and opening the valve 7. When this occurs the compressed air or gas in the bottle 4 flows through the casing 6 past the valve 7 and through the tube 16 and apertures 18 into the space 19 thence through the conduit 21 and tube 22 through the connection 23 into the pneumatic tire tending to raise the pressure in the tire and will continue to flow until the pressure in the tire and space 19 is restored to sixty pounds to the square inch, whereupon the diaphragm is forced outward carrying the tube 16 and releasing the valve 7 which immediately closes the opening through the casing 6 and prevents a further escape of fluid from the bottle 4.

Having thus described my improvement what I claim as new and desire to secure by Letters Patent is:

1. In a device of the kind described, a pneumatic tire mounted upon a wheel and a fluid receptacle attached to said wheel, in combination with a conduit connected to said tire and extending to said receptacle, and mechanism mounted upon said receptacle comprising a normally closed valve positioned within said receptacle and controlling an outlet thereof and mechanism connected to said conduit and detachable from said valve adapted to open the valve only when the pressure in the tire falls below a certain predetermined point.

2. In a device of the kind described, a pneumatic tire mounted upon a wheel and a fluid receptacle attached to said wheel, in combination with a conduit connected to said tire and extending to said receptacle, and mechanism mounted upon said receptacle comprising a normally closed valve controlling an outlet to the receptacle and mechanism connected to said conduit and detachable from said valve adapted to open the valve only when the pressure in the tire falls below a certain predetermined point.

3. In a device of the kind described, a pneumatic tire mounted upon a wheel and a fluid receptacle attached to said wheel, in combination with a conduit connected to said tire and extending to said receptacle and mechanism mounted upon said receptacle comprising a normally closed valve positioned within said receptacle and controlling an outlet thereof and mechanism connecting said conduit to said valve adapted to open the valve only when the pressure in the tire falls below a certain predetermined point.

In testimony whereof I have hereunto set my hand in the presence of two subscribing witnesses.

MELVON A. MARQUETTE.

Witnesses:
 FRANCIS M. WRIGHT,
 D. B. RICHARDS.